United States Patent
Daniel et al.

(10) Patent No.: US 8,497,866 B2
(45) Date of Patent: Jul. 30, 2013

(54) WIRELESS GRAPHICS CARD

(75) Inventors: Wayne Thomas Daniel, Garland, TX (US); Gregory L. Christison, Fairview, TX (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 12/208,746

(22) Filed: Sep. 11, 2008

(65) Prior Publication Data

US 2009/0066704 A1 Mar. 12, 2009

Related U.S. Application Data

(60) Provisional application No. 60/971,315, filed on Sep. 11, 2007.

(51) Int. Cl.
*G06F 13/14* (2006.01)
*G09G 5/36* (2006.01)

(52) U.S. Cl.
USPC .......................................... 345/520; 345/554

(58) Field of Classification Search
USPC .................................................. 345/520, 554
See application file for complete search history.

(56) References Cited

U.S. PATENT DOCUMENTS

| | | | |
|---|---|---|---|
| 5,748,913 A * | 5/1998 | Shibahara | 710/301 |
| 6,122,687 A * | 9/2000 | Jung | 710/100 |
| 7,027,483 B2 | 4/2006 | Santhoff et al. | |
| 7,257,641 B1 * | 8/2007 | VanBuskirk et al. | 709/238 |
| 7,391,790 B2 * | 6/2008 | Kim et al. | 370/466 |
| 7,650,519 B1 * | 1/2010 | Hobbs et al. | 713/300 |
| 2003/0027517 A1 | 2/2003 | Callway et al. | |
| 2003/0081630 A1 * | 5/2003 | Mowery et al. | 370/466 |
| 2006/0029145 A1 | 2/2006 | Rajagopal et al. | |
| 2006/0132492 A1 * | 6/2006 | Cantin | 345/519 |
| 2006/0164328 A1 * | 7/2006 | Jaff | 345/2.3 |

(Continued)

FOREIGN PATENT DOCUMENTS

| | | |
|---|---|---|
| JP | 2006174381 A | 6/2006 |
| JP | 2006186940 A | 7/2006 |

(Continued)

OTHER PUBLICATIONS

PCI-SIG, "PCI Express Card Electromechanical Specification Revision 1.1," Mar. 28, 2005, p. 1-90.*

(Continued)

*Primary Examiner* — David T Welch
(74) *Attorney, Agent, or Firm* — Nicholas J. Pauley; Sam Talpalatsky; Joseph Agusta (57) ABSTRACT

A device is provided for use in a portable computer. The device includes a wireless graphics card that includes a connector for coupling to an expansion slot of the portable computer and for receiving a plurality of signals from the portable computer, the plurality of signals including video, audio, and data signals and an ultra wideband (UWB) chipset coupled to the connector for processing the plurality of signals and for generating an OFDM modulated signal that includes at least the video signal, where the OFDM modulated signal including the video signal is wirelessly transmitted over an UWB link to a monitor for display.

22 Claims, 9 Drawing Sheets

U.S. PATENT DOCUMENTS

| | | | |
|---|---|---|---|
| 2007/0006269 A1* | 1/2007 | Huang et al. | 725/81 |
| 2007/0061414 A1* | 3/2007 | Bakke | 709/217 |
| 2007/0132733 A1 | 6/2007 | Ram | |
| 2007/0208973 A1* | 9/2007 | Wu et al. | 714/724 |
| 2008/0018653 A1* | 1/2008 | Liu | 345/520 |
| 2008/0117223 A1* | 5/2008 | Mayer et al. | 345/530 |
| 2008/0144726 A1* | 6/2008 | Ingber et al. | 375/240.28 |
| 2008/0270811 A1* | 10/2008 | Chow et al. | 713/323 |
| 2009/0029647 A1 | 1/2009 | Wei et al. | |

FOREIGN PATENT DOCUMENTS

| | | |
|---|---|---|
| JP | 2006295552 A | 10/2006 |
| WO | WO2006068878 A1 | 6/2006 |
| WO | WO2007065350 A1 | 6/2007 |

OTHER PUBLICATIONS

"High Rate Ultra Wideband PHY and MAC Standard", ecma International, Standard ECM-368, 1st Edition / Dec. 2005, Geneva, 27 pages.

International Search Report—PCT/US08/076007, International Search Authority—US, Nov. 24, 2008.

Supplementary European Search Report—EP08830664—Search Authority—Hague—Apr. 6, 2011.

Written Opinion—PCT/US2008/076007—International Search Authority European Patent Office—Nov. 24, 2008.

* cited by examiner

| PIN# | PCI EXPRESS MINI CARD SPECIFICATION | WIRELESS VIDEO + WUSB + BLUETOOTH PCI EXPRESS MINI CARD I/O | WIRELESS USB + BLUETOOTH MINI CARD I/O | BLUETOOTH MINI CARD I/O |
|---|---|---|---|---|
| 1 | WAKE# | WAKE# | WAKE# | - |
| 2 | 3.3V | 3.3V | 3.3V | 3.3V |
| 3 | RESERVED | ML_Lane_0(p) | - | - |
| 4 | GND | GND | GND | GND |
| 5 | RESERVED | ML_Lane_0(n) | - | - |
| 6 | 1.5V | DDC_Data | - | - |
| 7 | CLKREQ# | MODULE DETECT# | MODULE DETECT# | MODULE DETECT# |
| 8 | UIM_PWR | ML_Lane_1(p) | - | - |
| 9 | GND | GND | GND | GND |
| 10 | UIM_DATA | ML_Lane_1(n) | - | - |
| 11 | REFCLK- | REFCLK- | REFCLK- | - |
| 12 | UIM_CLK | DDC_Clock | - | - |
| 13 | REFCLK+ | REFCLK+ | REFCLK+ | - |
| 14 | UIM_RESET | ML_Lane_2(p) | - | - |
| 15 | GND | GND | GND | GND |
| 16 | UIM_VPP | ML_Lane_2(n) | - | - |
| 17 | UIM_C8 | ML_Lane_3(p) | - | - |
| 18 | GND | GND | GND | GND |
| 19 | UIM_C4 | ML_Lane_3(n) | - | - |
| 20 | W_DISABLE# | W_DISABLE# | W_DISABLE# | W_DISABLE# |
| 21 | GND | GND | GND | GND |
| 22 | PERST# | PERST# | PERST# | PERST# |
| 23 | PERn0 | PERn0 | PERn0 | - |
| 24 | 3.3Vaux | Open | - | - |
| 25 | PERp0 | PERp0 | PERp0 | - |
| 26 | GND | GND | GND | GND |

702 — NO CHANGE. REQUIRED FOR BLUETOOTH AND/OR WUSB.

704 — CHANGED FOR WIRELESS GRAPHICS (DisplayPort) USE.

706 — CHANGED FOR AUDIO (HD AUDIO) USE.

708 — CHANGED FOR DisplayPort AUXILIARY CHANNEL (AUDIO) USE.

*FIG. 7A*

| PIN# | PCI EXPRESS MINI CARD SPECIFICATION | WiDV II + BLUETOOTH PCI EXPRESS MINI CARD I/O | WIRELESS USB + BLUETOOTH MINI CARD I/O | BLUETOOTH MINI CARD I/O |
|---|---|---|---|---|
| 27 | GND | GND | GND | GND |
| 28 | 1.5V | HD_Audio_RST# | - | - |
| 29 | GND | GND | GND | GND |
| 30 | SMB_CLK | SMB_CLK | SMB_CLK | SMB_CLK |
| 31 | PETn0 | PETn0 | PETn0 | - |
| 32 | SMB_DATA | SMB_DATA | SMB_DATA | SMB_DATA |
| 33 | PETp0 | PETp0 | PETp0 | PETp0 |
| 34 | GND | GND | GND | GND |
| 35 | GND | GND | GND | GND |
| 36 | USB_D- | USB_D- | USB_D- | USB_D- |
| 37 | RESERVED | HD_Audio_SYNC | - | - |
| 38 | USB_D+ | USB_D+ | USB_D+ | USB_D+ |
| 39 | RESERVED(3.3V) | 3.3V | 3.3V | 3.3V |
| 40 | GND | GND | GND | GND |
| 41 | RESERVED(3.3V) | 3.3V | 3.3V | 3.3V |
| 42 | LED_WWAN# | HD_Audio_BCLK | - | - |
| 43 | RESERVED(GND) | GND | GND | GND |
| 44 | LED_WLAN# | HD_Audio_SDO/SPDIF_TX | - | - |
| 45 | RESERVED | HOT PLUG DETECT | - | - |
| 46 | LED_WPAN# | LED_WPAN# | LED_WPAN# | LED_WPAN# |
| 47 | RESERVED | DDC_Clock | - | - |
| 48 | 1.5V | HD_Audio_SDI/SPDIF_RX | - | - |
| 49 | RESERVED | AUX_CH(p) | - | - |
| 50 | GND | GND | GND | GND |
| 51 | RESERVED | AUX_CH(n) | - | - |
| 52 | 3.3V | 3.3V | 3.3V | 3.3V |

702 — NO CHANGE. REQUIRED FOR BLUETOOTH AND/OR WUSB.

704 — CHANGED FOR WIRELESS GRAPHICS (DisplayPort) USE.

706 — CHANGED FOR AUDIO (HD AUDIO) USE.

708 — CHANGED FOR DisplayPort AUXILIARY CHANNEL (AUDIO) USE.

WIRELESS GRAPHICS CARD

PRIORITY DATA

This application claims priority to Provisional Application Ser. No. 60/971,315, filed on Sep. 11, 2007, entitled "WIRELESS GRAPHICS CARD," the entire disclosure of which is hereby incorporated by reference.

BACKGROUND

It is frequently desirable to provide wireless communication technologies in various applications for convenience, mobility, and efficiency. Increased usage of portable notebook personal computers (PCs) and other portable computing devices has generated a demand for wireless connectivity to stationary peripherals such as display monitors, mass storage, human input devices, printers, scanners, and legacy wired USB devices.

Display monitors typically receive video signals for display over a wired media such as component analog video, Digital Video Interface (DVI) or Video Graphic Array (VGA), or other suitable video signals. State of the art computer monitors and receive their incoming signal either digitally or by composite video over wires. There are inherent advantages of having a wireless interface instead of a wired interface. These include the flexibility of locating the display device anywhere in the home or office rather than being restricted to locations close to the video source. While it is increasingly common today for computers to have wireless peripheral devices such as a keyboard, mouse, or printer, the data transmitted by these devices require a relatively small bandwidth compared to the video signals sent to display monitors.

Ultra-wideband (UWB) technology has been developed for wireless communication that uses a wideband of the RF spectrum for transmitting data. As such, UWB technology has a limited interference range with other wireless technologies and includes more available channels for communication. Additionally, each UWB channel may have a bandwidth greater than 500 MHz. In this way, UWB technology is able to transmit more data in a given period of time and support wireless communication of video signals.

Therefore, what is needed is an apparatus and method for wireless providing PC graphics or video from a portable computer to a display monitor by interfacing to standard "natural" video, audio, and data interfaces in the portable computer.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Furthermore, all features may not be shown in all drawings for simplicity.

DETAILED DESCRIPTION

The present invention relates generally to transmission and encryption systems. It is understood, however, that the following disclosure provides many different embodiments, or examples, for implementing different features of the invention. Specific examples of components, signal pin assignments, and arrangements are described below to simplify the present disclosure. These are, of course, merely examples and are not intended to be limiting.

Figure 1:
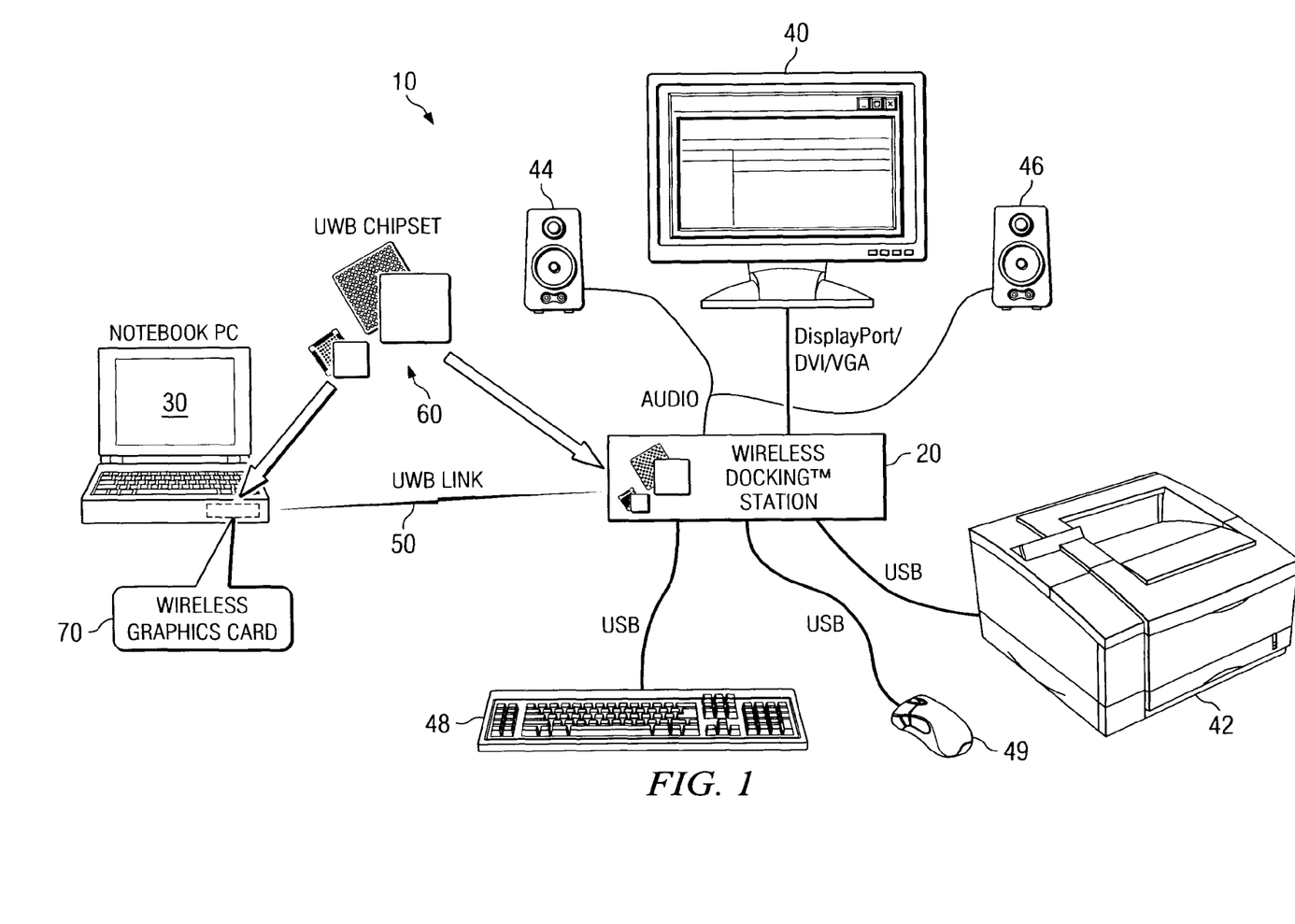
FIG. 1 is a perspective view of a system for wireless providing video signals according to one or more embodiments of the present disclosure.

Referring to FIG. 1, illustrated is a perspective view of a system 10 for wirelessly providing video signals according to one or more embodiments of the present disclosure. The system 10 may include a wireless personal area network (WPAN). The system 10 may be implemented as an ultra wideband (UWB) system. The UWB system utilizes an unlicensed frequency spectrum between 3.1 and 10.6 GHz which is divided into fourteen (14) bands, each with a bandwidth of 528 MHz. Accordingly, the UWB system is capable of providing data transmission speeds of up to 1 Gbps or more for short range (e.g., a few meters) wireless communications.

The UWB system may utilize an orthogonal frequency-division multiplexing (OFDM) scheme for transmitting information. OFDM is a form of wireless multi-carrier modulation wherein carrier spacing is selected so that each sub-carrier is orthogonal to the other sub-carriers, This orthogonality avoids adjacent channel interference and prevents the demodulators from seeing frequencies other than their own. The OFDM signal includes a plurality of sub-carriers, each sub-carrier is modulated with a conventional modulation scheme (e.g., quadrature amplitude modulation). In the UWB system of the disclosed embodiment, the OFDM signal includes 128 sub-carriers (also referred to as tones) that are used per band, of which, 100 are data sub-carriers, 12 are for pilot information, 10 are guard tones, and 6 are null tones carrying no information.

In the illustrative example, the system 10 includes a wireless docking station 20 that facilitates wireless communication of various stationary peripheral devices with a portable computer or laptop 30 containing a wireless graphics card 70. One or more devices, such as a display monitor 40, printer 42, speakers 44, 46, keyboard 48, and mouse 49, may be physically coupled with wireless docking station 20 by various types of cables. For example, the printer 42, keyboard 48, and mouse 49 may be coupled to the wireless docking station 20 by a universal serial bus (USB) cable, the speakers 44, 46 may be coupled to the wireless docking station 20 by audio cables, and the display monitor 40 may be coupled to the wireless docking station 20 by video cables suitable for DisplayPort interface or Digital Video Interface (DVI) or Video Graphic Array (VGA) signals. These various types of cables and their communication protocols are known in the art and thus are not described in detail here.

The wireless docking station 20 provides support for Certified Wireless USB Hub functionality, Wired DisplayPort/DVI/VGA output port for connectivity to a video display or monitor, multiple USB ports for connection to USB devices, and WiMedia/WUSB PHY data rates and extended data rates of up to 1.3 Gbps.

The laptop 30 and wireless docking station 20 may wireless communicate using a UWB link 50 to exchange video, audio, and data signals. As such, the laptop 30 may wirelessly transmit video graphics to the display monitor 40 for display and audio to the speakers 44, 46 via the wireless docking station 20 Also, the laptop 30 may wirelessly transmit data to the printer 42 for printing via the wireless docking station 20. Typical ranges of the UWB link 50 are very limited, such as a few meters. Accordingly, the wireless docking station 20 and laptop computer 30 each include a UWB chipset 60 for facilitating wireless communication over the UWB link 50, and may wirelessly transmit OFDM modulated data. The UWB chipset 60 for the laptop 30 may be implemented in a wireless graphics card 70 as will be discussed in detail below. It is understood that the laptop computer 30 may directly transmit information to these devices if they were UWB enabled themselves.

The UWB chipset 60 may include a UWB transceiver, baseband Physical (PHY) Layer, Media Access Control (MAC) Layer, and other components for providing an operating environment for the chipset. The UWB transceiver may be implemented as a radio frequency (RF) transceiver including an antenna for transmitting RF signals. The baseband Physical (PHY) Layer is capable of data transmission speeds of up to 1 Gbps. The Media Access Control (MAC) Layer provides network timing, addressing, and channel access control mechanisms for the PHY Layer. The PHY and MAC Layers may be configured in compliance with standards such as the WiMedia or ECMA-368/369 which is hereby incorporated by reference in its entirety. These various components may be provided in a chipset available at WiQuest Communications, Inc., 915 Enterprise Blvd., Suite 200, Allen, Tex., 75013.

A host system, such as a laptop, may provide data such as video, audio, and other data information to the MAC Layer. The MAC Layer provides an interface between the host system and the PHY Layer. The MAC Layer generates digital data in a required format for the PHY Layer. The PHY Layer divides the UWB spectrum into fourteen bands, each with a bandwidth of 528 MHz. The fourteen bands are further defined into five band groups, of which, four band groups each comprise three bands and one band group comprises two bands. Within each of the first four band groups, the PHY Layer defines four time frequency codes (TFC) using time frequency interleaving (TFI) and three TFC using fixed frequency interleaving (FFI), and thus, the PHY Layer provides support for up to seven channels per band. In the fifth band group, the PHY Layer defines two TFC using FFI. Accordingly, a total of thirty channels are specified in the PHY Layer. The PHY Layer may provide a digital baseband signal to a digital-to-analog converter (DAC) which converts the digital input signal into an analog information signal.

The analog information signal (including the video, audio, or other data information from the host system) may be provided to the UWB transceiver for transmission. The UWB transceiver may include an RF subsystem that receives the information signal and processes it to generate a radio signal. As previously described, the UWB system utilizes an orthogonal frequency-division multiplexing (OFDM) scheme for transmitting information. The radio signal may be inputted to a variable gain amplifier for powering the radio signal for transmission via the antenna. It is understood that the UWB transceiver may include various other components or functions known in the art such as clocks, mixers, and filters.

Figure 2:
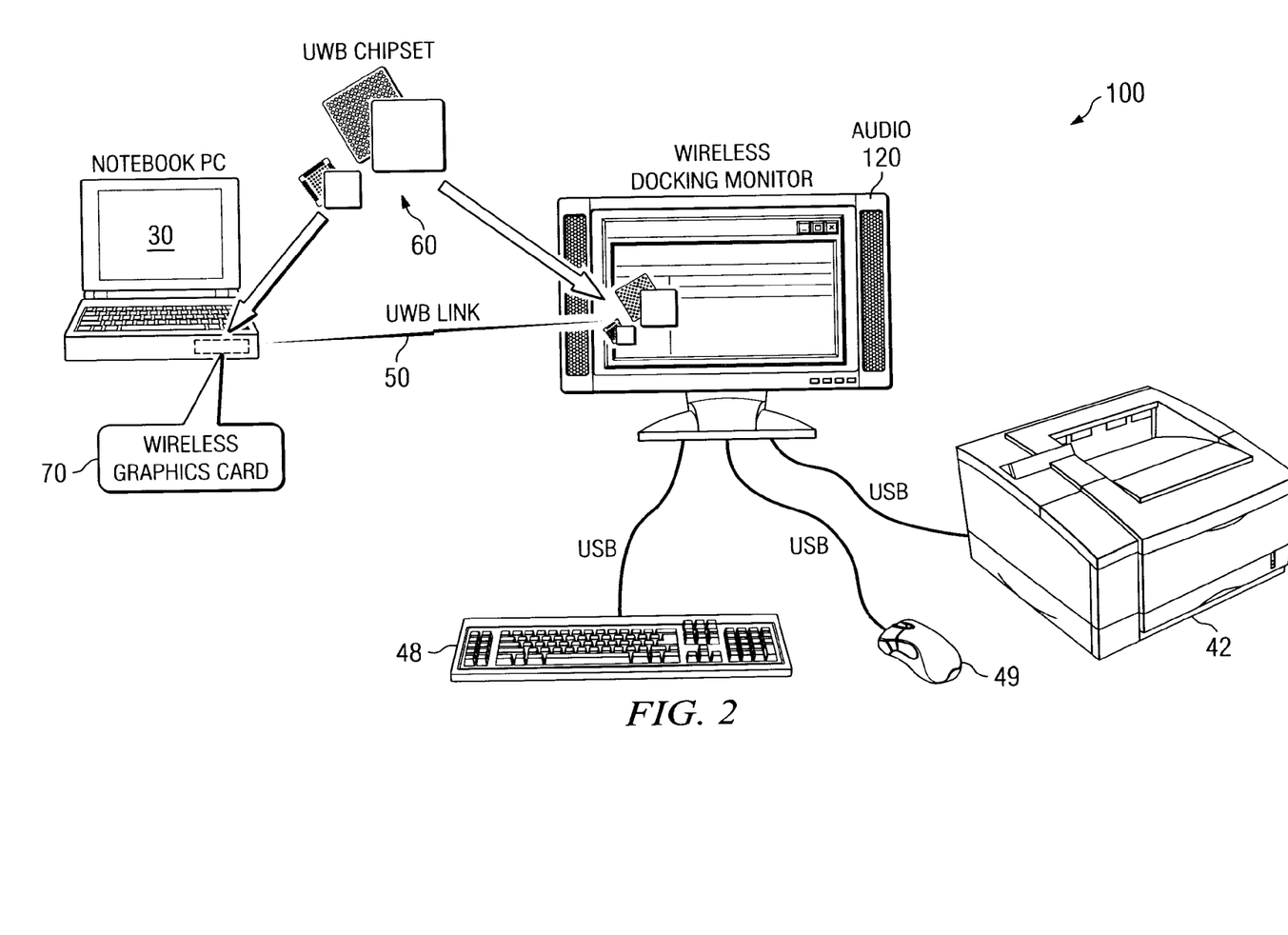
FIG. 2 is a perspective view of alternative system for wireless providing video signals according to one or more embodiments of the present disclosure.

Referring to FIG. 2, illustrated is a perspective view of an alternative system 100 for wirelessly providing video signals according to one or more embodiments of the present disclosure. Similar features in FIGS. 1 and 2 are numbered the same for simplicity and clarity. In the system 100, the laptop 30 contains a wireless graphics card 70 which wireless communicates with a wireless docking monitor 120 instead of the wireless docking station 20 of FIG. 1. The wireless docking monitor 120 and laptop 30 may each include the UWB chipset 60 of FIG. 1. The wireless docking monitor 120 is configured as a display monitor with internal speakers for processing video and audio signals. As such, the laptop 30 may wirelessly transmit the video and audio signals over the UWB link 50 to the wireless docking monitor 120 for displaying video and generating sound. Also, wireless docking monitor 120 may be physically coupled to a printer 42, keyboard 48, and mouse 49 via a USB cable. Accordingly, the laptop 30 may wirelessly transmit data signals to the printer 42 for printing via the wireless docking monitor 120.

Figure 3:
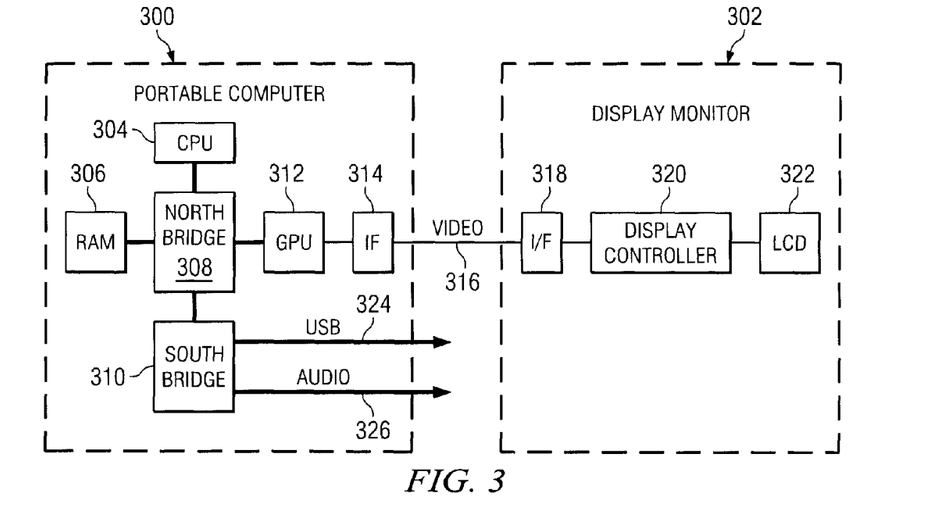
FIG. 3 is a simplified diagrammatic view of a wired connection between a portable computer and a display monitor.

Referring to FIG. 3, illustrated is a simplified diagrammatic view of a conventional wired connection between a portable computer 300 and a display monitor 302. The portable computer 300 includes a central processing unit (CPU) 304, random access memory (RAM) 306, north bridge 308, south bridge 310, graphical processing unit (GPU) 312, and vide interface (I/F) 314 which may be VGA, DVI, HDMI or DisplayPort. These components are known in the art and thus are not described in detail here. The north bridge 308 (also known as the memory controller hub) facilitates communication between the CPU 304, RAM 306, or GPU 312, and the south bridge 310. The north bridge 308 provides information to the GPU 312 for processing and generating video graphics 316 for display on the display monitor 302. The display monitor 302 may include an interface (I/F) 318, display controller 320, and LCD 322. The south bridge 310 (also known as the I/O controller hub (ICH)) may be responsible for handling slower components (not shown). As such, the south bridge 310 supports USB 324 and audio 326 standards for connecting to peripherals such as printers and speakers, respectively. Internally, video Graphics, Audio, and Data signals may utilize specific purpose buses. It is understood that the portable computer 300 may include other functional components which are not shown for the sake of clarity. For example, an operating system runs on the CPU 304 and is used to coordinate and provide control of the various components. Instructions for the operating system and applications or programs may be located on storages devices, such as hard disk drive, and may be loaded into the main memory for execution by the CPU 304.

Figure 4:
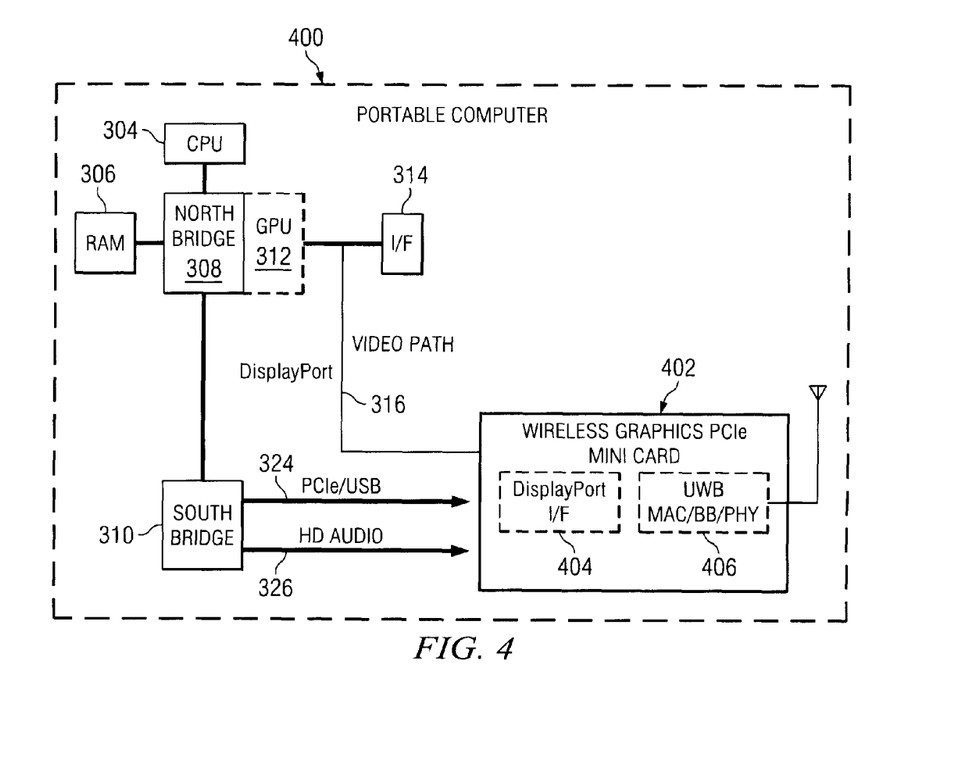
FIG. 4 is a simplified diagrammatic view of a portable computer having a wireless graphics card according to various aspects of the present disclosure.

Referring to FIG. 4, illustrated is a simplified diagrammatic view of a portable computer 400 having a wireless graphics card 402 for facilitating wireless communication over a UWB link in the systems 10, 100 of FIGS. 1 and 2. The portable computer 400 is similar to the portable computer 300 of FIG. 3. Similar features in FIGS. 3 and 4 are numbered the same for simplicity and clarity. The portable computer 400 includes a central processing unit (CPU) 304, random access memory (RAM) 306, north bridge 308, south bridge 310, graphical processing unit (GPU) 312, and interface (I/F) 314. The laptop computer 400 may include an internal system bus implemented as a mini PCI bus architecture, although other bus architectures may be used. The wireless graphics card 402 may include a DisplayPort interface (I/F) 404 and a UWB chipset 406 similar to the chipset 60 discussed in FIG. 1. Alternatively, the UWB chipset 406 may be implemented as a single chip (i.e., system on chip (SoC)). The wireless graphics card 402 may include a PCI Express (PCIe) mini-card connector and may connect to the internal system bus of the portable computer 400 via one or more expansion slots. The PCIe interface format is known and thus not described in detail herein. The wireless graphics card 402 may be provided with video Graphics, Audio, and Data information from the portable computer 400 and may process the information for wireless communication over the UWB link 50 as shown was discussed in FIGS. 1 and 2. Accordingly, the wireless graphics card 402 supports industry standards such as DisplayPort 316 for video, HD Audio 326 for audio, and PCIe/USB 324 for data interfaces. Alternatively, the audio interface may utilize S/PDIF or USB Audio.

Figure 5:
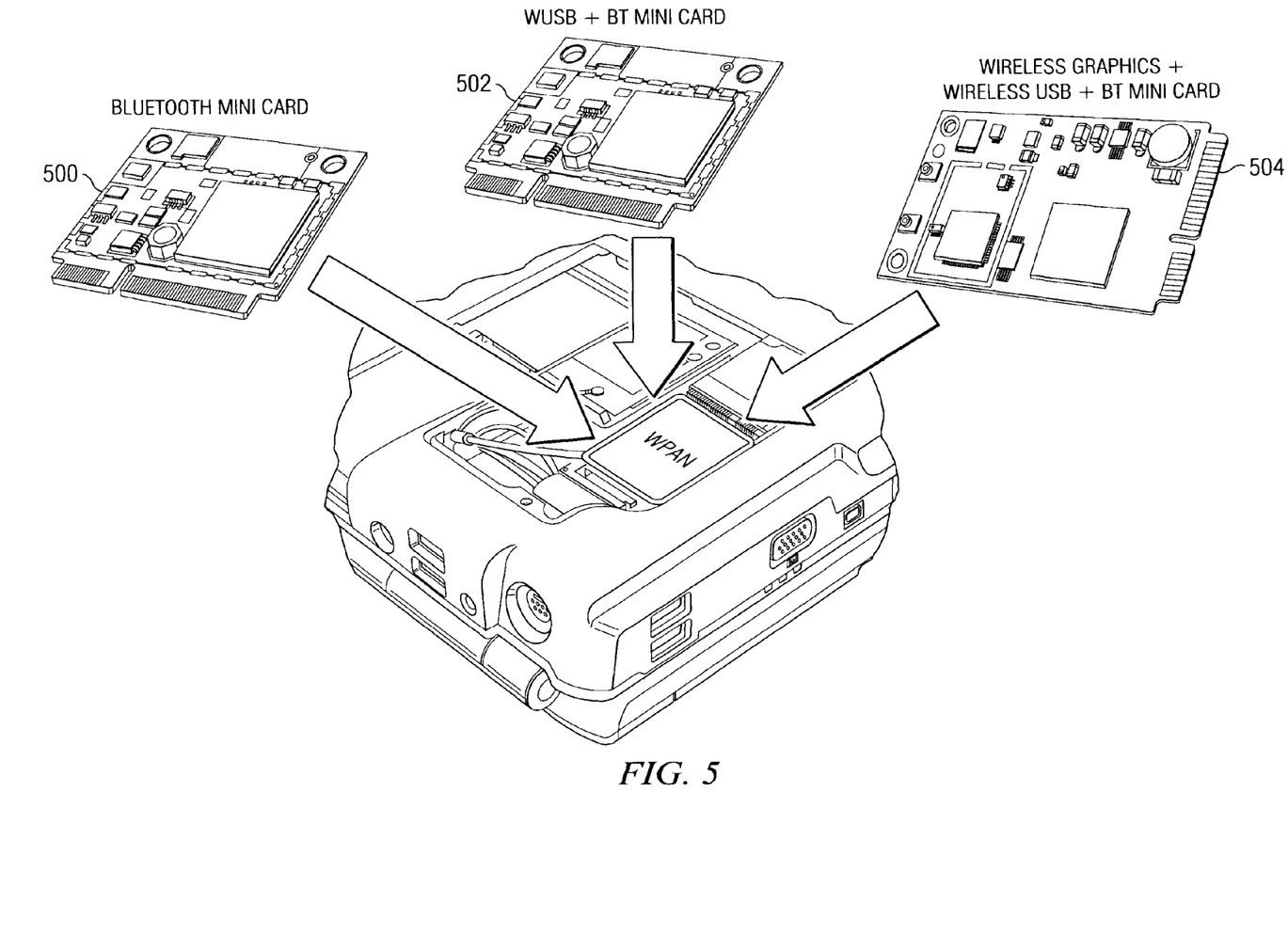
FIG. 5 is a perspective view of several embodiments of the wireless graphics card of FIG. 4.

Referring to FIG. 5, illustrated are several embodiments 500, 502, 504 of the wireless graphics card 402 of FIG. 4. The portable computer 400 of FIG. 4 may include a single mini-card slot for connecting to the wireless graphics card 402. The wireless graphics card 402 may be configured to support multiple WPAN cards such as Bluetooth® only 500, wireless USB (WUSB) and Bluetooth® 502, and Wireless Video, WUSB, and Bluetooth® 504 in the same mini card slot. Bluetooth® and WUSB are known standards for exchanging data between devices. It is understood that Bluetooth refers to the specification of Bluetooth wireless technology, and the trademarks are owned by Bluetooth SIG and are licensed out for use to companies that incorporate Bluetooth wireless technology into their products. The Wireless Video may be implemented by WiQuest's WiDV II (Wireless Digital Video) Technology for delivering wireless digital video communications (also supports HD Audio). The wireless graphics card 402 supports simultaneous certified wireless USB connectivity (from USB Implementers Forum, Inc., that uses WiMedia MB-OFDM UWB radio platform as developed by the WiMedia Alliance), wireless DisplayPort and HD Audio functionality via WiQuest WiDV II Technology, and WiMedia/WUSB PHY data rates and extended data rates up to 1.3 Gbps. These various components are available at WiQuest Communications, Inc., 915 Enterprise Blvd., Suite 200, Allen, Tex., 75013.

Figure 6:
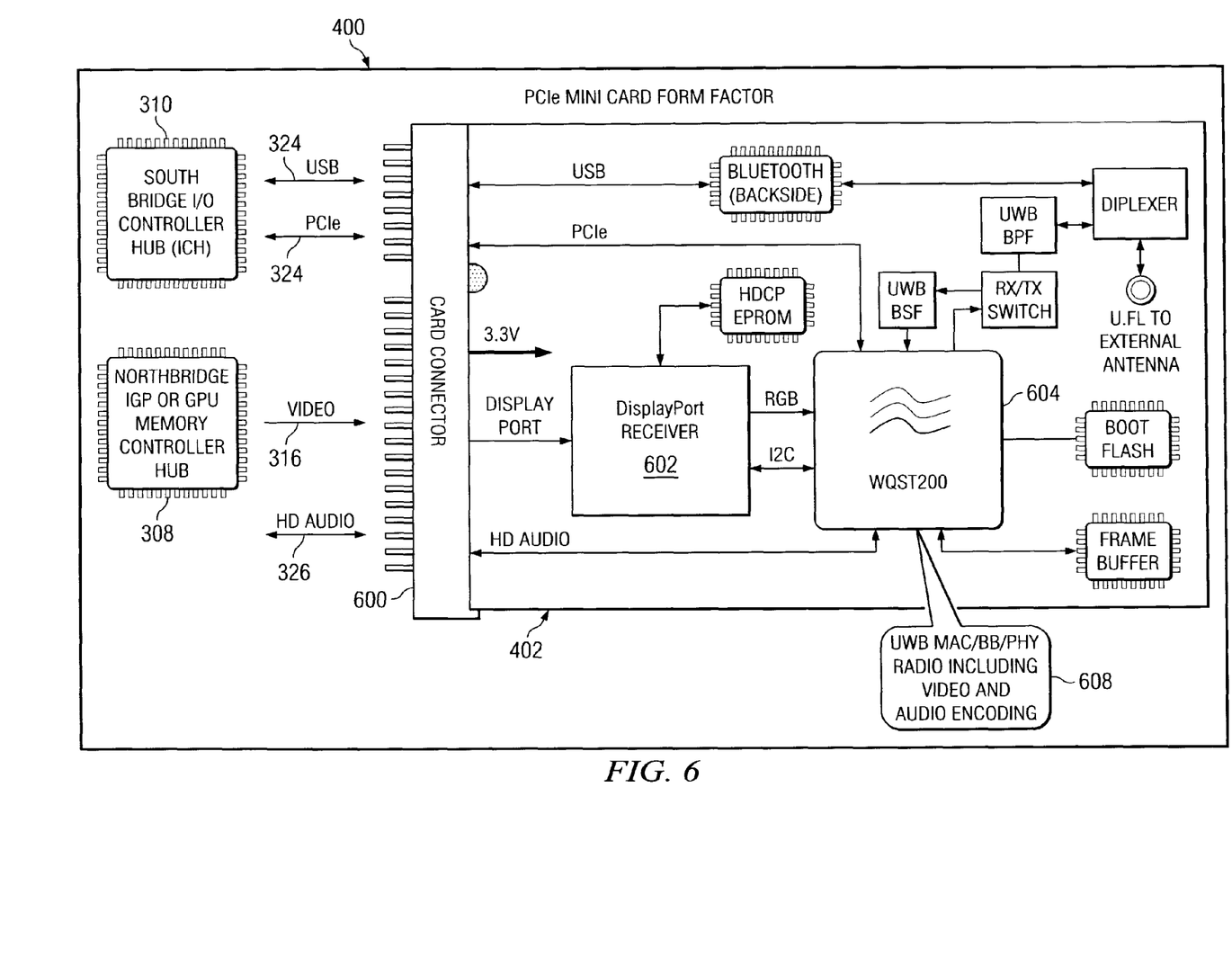
FIG. 6 is a diagrammatic view of the wireless graphics cards of FIG. 5 implemented in a PCI Express full mini-card form factor.

Referring to FIG. 6, illustrated is diagrammatic view of the wireless graphics cards of FIG. 5 implemented on a PCIe full mini-card form factor. The PCIe full mini-card factor may include a printed circuit board (PCB) for providing mechanical support and electrical connections to the various components. The size of the PCB complies with PCIe mini card specifications as is known in the art. The PCIe full mini-card form factor is suitable for connecting and fitting into an expansion slot within the portable computer 400. Similar features in FIGS. 4 and 6 are numbered the same for simplicity and clarity. In the illustrative example, the wireless graphics card 402 is configured to support Bluetooth®, WUSB, and Wireless Video 504 (FIG. 5). The wireless graphics card 402 may include a standard card connector 600 that supports PCIe (i.e., PCIe mini card connector). PCIe is a computer expansion card interface format that is known in the art. The card connector 600 is coupled to an expansion slot provided in the portable computer 400 for connecting to the internal bus system of the portable computer. Accordingly, various signals (including Video, Audio, and Data information) are provided from the portable computer 400 (via the north 308 and south 310 bridges) to the wireless graphics card 402 for processing and wirelessly transmitting over the UWB link 50 (FIGS. 1 and 2).

For the video interface, a DisplayPort receiver 602 may be used for the connection, and may provide RGB video signals and I2C control interface signals. The DisplayPort receiver 602 may be coupled to High-Bandwidth Digital Content Protection (HDCP) EPROM that provides for a protection scheme as is known in the art. As an alternative embodiment, this video interface receiver may be integrated into the UWB chipset. For audio, HD Audio or S/PDIF or USB Audio (known digital audio standards) may be used for the connection. The video and audio information may be routed from the portable computer's system board to the card connector 600. Additionally, standard PCIe and USB signals from the south bridge 310 may be routed to the card connector 600 as well. A UWB chipset 604 similar to the one 60 in FIG. 1 may be responsible for properly receiving and processing of the video (RGB), audio (HD Audio or S/PDIF), control (I2C), and data (PCIe/USB) signals. Also, the UWB chipset 604 may be responsible for the actual transmission and reception of all UWB signals, both control and information signals as was discussed in FIG. 1. Further, the UWB chipset 604 may include video and audio encoding circuitry 608 such as the one described in commonly-owned U.S. application Ser. No. 11/114,752, entitled "Method and Apparatus for Encoding Interleaving and Mapping Data to Facilitate Gbps Data Rates in Wireless Systems," filed on Apr. 25, 2005, which is hereby incorporated by reference. It is understood that the wireless graphics card 402 may include other components such as memory, buffer, diplexer, switches, and filters for providing an operating environment for the UWB chipset 604.

Figure 7A:
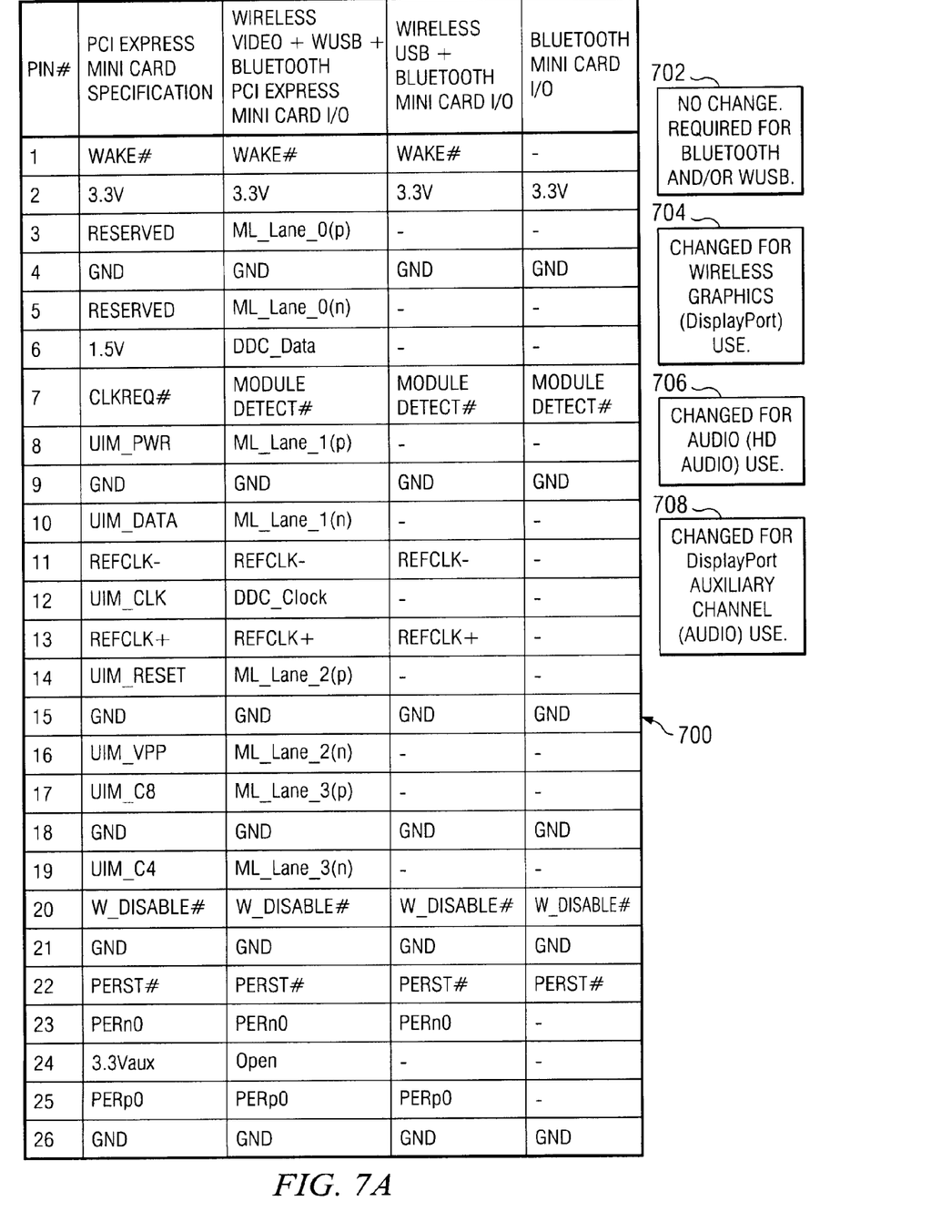
FIGS. 7A & 7B is diagrammatic view of the input/output pin connections of the various embodiments of the wireless graphics cards of FIG. 5.
Figure 7B:
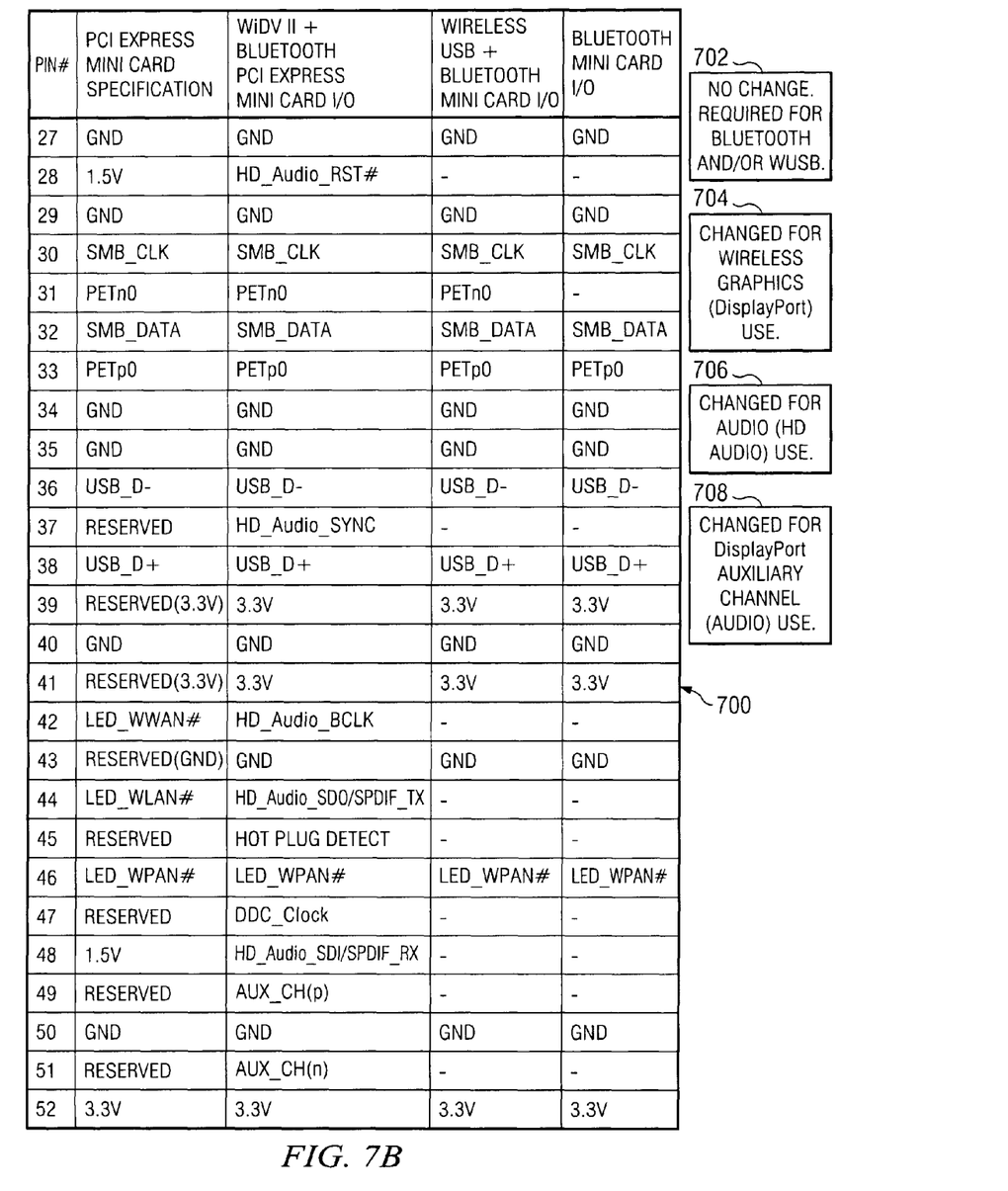

Referring to FIGS. 7A and 7B, illustrated is a chart 700 of the input/output pin connections of a PCIe mini card connector for the various configurations of the wireless graphics cards of FIG. 5. The chart 700 shows the pin connections for Bluetooth® only 500, WUSB and Bluetooth® 502, and Wireless Video, WUSB, and Bluetooth® 504 (FIG. 5). The table below shows the pin numbers and their description (I/O definitions) for the PCIe mini-card specification for the various wireless graphics cards, and also the wireless docking station 20 of FIG. 1.

| Pin # | PCI Express Mini-Card Specification | Wireless Graphics Card PCI Express Mini-Card Specification | PCI Express Mini-Card I/O | Pull-up/Pull-down required from the PC | Description |
|---|---|---|---|---|---|
| 1 | WAKE# | WAKE# | — | — | PCIe WAKE# |
| 2 | 3.3 V | 3.3 V | — | — | 3.3 volt power |
| 3 | Reserved | ML_Lane_0(p) | Input | None | DisplayPort ML_Lane_0(p) |
| 4 | GND | GND | — | — | Ground |
| 5 | Reserved | ML_Lane_0(n) | Input | None | DisplayPort ML_Lane_0(n) |
| 6 | 1.5 V | DDC_Data | Input/Output | Pull-up | Display Data |

-continued

| Pin # | PCI Express Mini-Card Specification | Wireless Graphics Card PCI Express Mini-Card Specification | PCI Express Mini-Card I/O | Pull-up/Pull-down required from the PC | Description |
|---|---|---|---|---|---|
| 7 | CLKREQ# | Module Detect # | Output | Pull-up | Low indicates that the module is installed. High indicates that the module is not installed. |
| 8 | UIM_PWR | ML_Lane_1(p) | Input | None | DisplayPort ML_Lane_1(p) |
| 9 | GND | GND | — | — | Ground |
| 10 | UIM_DATA | ML_Lane_1(n) | Input | None | DisplayPort ML_Lane_1(n) |
| 11 | REFCLK– | REFCLK– | Input | None | |
| 12 | UIM_CLK | DDC_Clock | — | — | DisplayPort Display Data Clock |
| 13 | REFCLK+ | REFCLK+ | Input | None | |
| 14 | UIM_RESET | ML_Lane_2(p) | Input | None | DisplayPort ML_Lane_2(p) |
| 15 | GND | GND | — | — | Ground |
| 16 | UIM_VPP | ML_Lane_2(n) | Input | None | DisplayPort ML_Lane_2(n) |
| 17 | UIM_C8 | ML_Lane_3(p) | Input | None | DisplayPort ML_Lane_3(p) |
| 18 | GND | GND | — | — | Ground |
| 19 | UIM_C4 | ML_Lane_3(n) | Input | None | DisplayPort ML_Lane_3(n) |
| 20 | W_DISABLE# | W_Disable# | Input | None | Connects to the WQST200's RADIO_GRCIO0 pin. Low disables the UWB RF transceiver. High enables the UWB RF transceiver |
| 21 | GND | GND | — | — | Ground |
| 22 | PERST# | RESET# | Input | None | Low resets the PCI Express Mini-Card. High enables the PCI Express Mini-Card for normal operation |
| 23 | PERn0 | PERn0 | Input | None | PCIe Receive n |
| 24 | 3.3Vaux | Open | — | — | — |
| 25 | PERp0 | PERp0 | Input | None | PCIe Receive p |
| 26 | GND | GND | — | — | Ground |
| 27 | GND | GND | — | — | Ground |
| 28 | 1.5 V | RST# | Input | None | HD Audio Global active low reset |
| 29 | GND | GND | — | — | Ground |
| 30 | SMB_CLK | SMB_CLK | Input | None | SMB_CLK |
| 31 | PETn0 | PETn0 | Output | None | PCIe Transmit n |
| 32 | SMB_DATA | SMB_DATA | Input/Output | — | SMB_DATA |
| 33 | PETp0 | PETp0 | Output | None | PCIe Transmit p |
| 34 | GND | GND | — | — | Ground |
| 35 | GND | GND | — | — | Ground |
| 36 | USB_D– | USB_D– | Input/Output | None | USB differential data – |
| 37 | Reserved | SYNC | Input | — | HD Audio SYNC |
| 38 | USB_D+ | USB_D+ | Input/Output | None | USB differential data + |
| 39 | Reserved(3.3 V) | 3.3 V | — | — | 3.3 volt power |
| 40 | GND | GND | — | — | Ground |
| 41 | Reserved(3.3 V) | 3.3 V | — | — | 3.3 volt power |
| 42 | LED_WWAN# | BCLK | Input | — | HD Audio Bit Clock |
| 43 | Reserved(GND) | GND | — | — | Ground |
| 44 | LED_WLAN# | SDO/SPDIF_TX | Input | — | HD Audio SDO/S/PDIF input |
| 45 | Reserved | Hot Plug Detect | Output | Pull-down | The PCI Express Mini-Card drives this pin. Low indication that a monitor is not connected. High indicates that a monitor is connected. |
| 46 | LED_WPAN# | LED_WPAN# | Output | None | LED_WPAN# |
| 47 | Reserved | DDC_Clock | Input/Output | Pull-up | Display DDC clock |
| 48 | 1.5 V | SDI/SPDIF_RX | Output | None | HD Audio SDI/S/PDIF output |
| 49 | Reserved | AUX_CH(p) | Input/Output | — | DisplayPort AUX_CH(p) |
| 50 | GND | GND | — | — | Ground |
| 51 | Reserved | AUX_CH(n) | Input/Output | — | DisplayPort AUX_CH(n) |
| 52 | 3.3 V | 3.3 V | — | — | 3.3 volt power |

All standard PCIe mini card signals for WPAN usage are left in place such as 3.3 V power and ground, PCIE, USB, and LED. The chart 700 illustrates which PCIe mini card signals are re-defined/changed for the various configurations of the wireless graphics cards 500, 502, 504 of FIG. 5. For Bluetooth and/or WUSB specifications 702, no changes are required. For Wireless video Graphics (DisplayPort) use 704, pins 3, 5, 6, 8, 10, 12, 14, 16, 17, 19, 45, and 47 are changed accordingly. For audio (HD Audio) use 706, pins 28, 37, 42, 44, and 48 are changed accordingly. For DisplayPort Auxiliary Channel (Audio) use 708, pins 49 and 51 are changed accordingly. Accordingly, the pin definitions of the wireless graphics card allow slot compatibility with other WPAN cards. The I/O definitions supports Bluetooth® only 500, WUSB and Bluetooth® 502, and Wireless Video, WUSB, and Bluetooth® 504 (FIG. 5). The chart 700 shows that the same WPAN slot (within a portable computer such as the one 400 of FIG. 4) is compatible with multiple WPAN cards. It should be noted that the above signal pin assignments are mere examples, and that alternative embodiments of the wireless graphics card signal assignments may be supported including (but not limited to) preserving the standard mini card signal assignments and adding the video and audio signals to an additional connector on the mini card.

Figure 8:
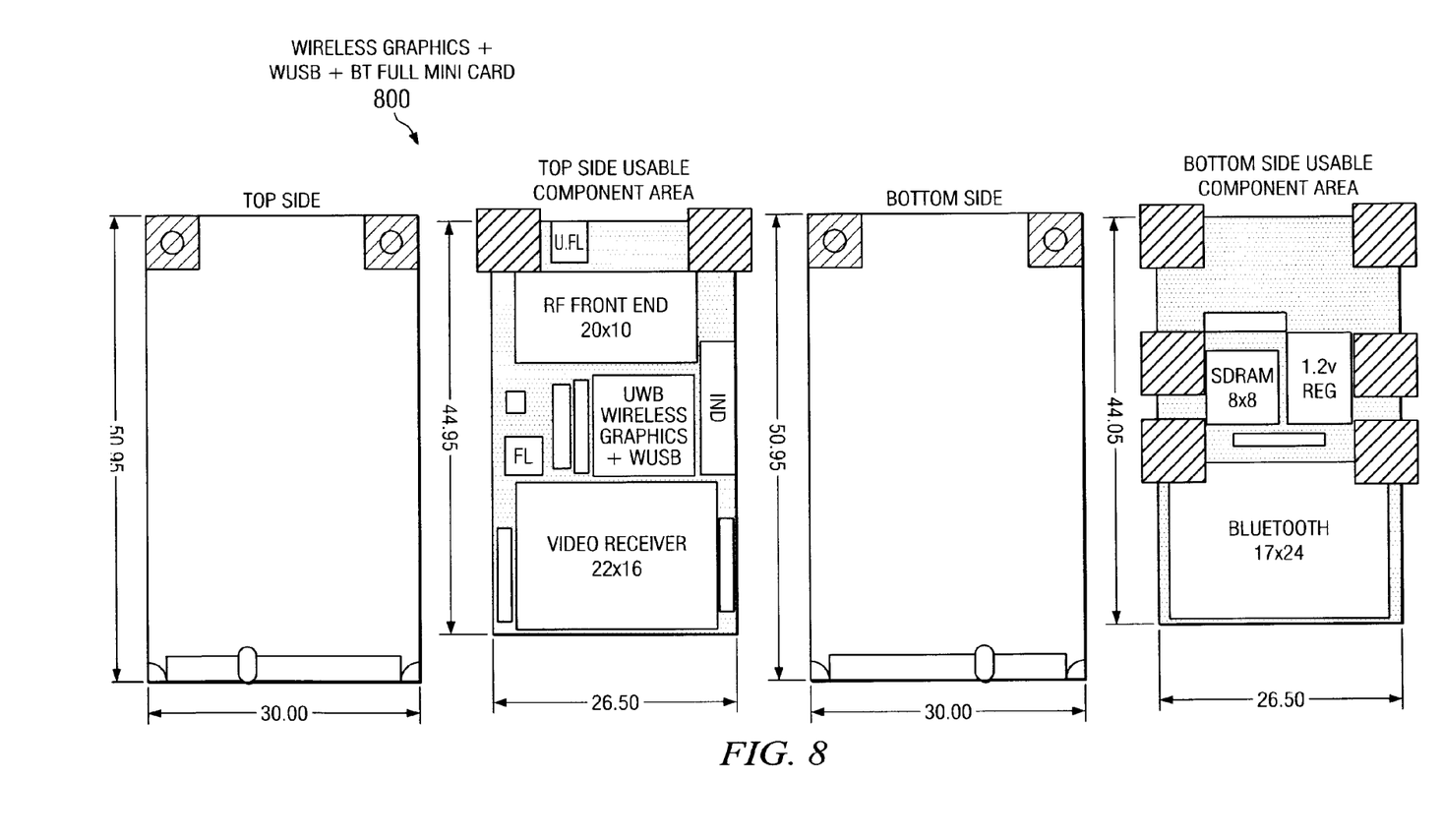
FIG. 8 are top and bottom views of the wireless graphics cards of FIG. 5 implemented on a full mini-card form factor.

Referring to FIG. 8, illustrated are top and bottom views of the wireless graphics cards FIG. 5 implemented on a full mini card 800. The full mini card 800 may be implemented by a printed circuit board (PCB). The wireless graphics card 402 may be configured as was described in FIG. 5, to support Bluetooth® only 500, WUSB and Bluetooth® 502, and Wireless Video, WUSB, and Bluetooth® 504. For Bluetooth only 500, and WUSB and Bluetooth® 502 configurations, all components may be located on a single side (top or bottom) of the full mini card 800 (not shown). In the illustrative example, for Wireless Video and WUSB and Bluetooth® 504 configuration, all components may be located on two sides (top and bottom) of the full mini card 800 as shown. The full mini card 800 supports all these various WPAN cards such that they are able to fit in a single expansion slot of a portable computer.

Figure 9:
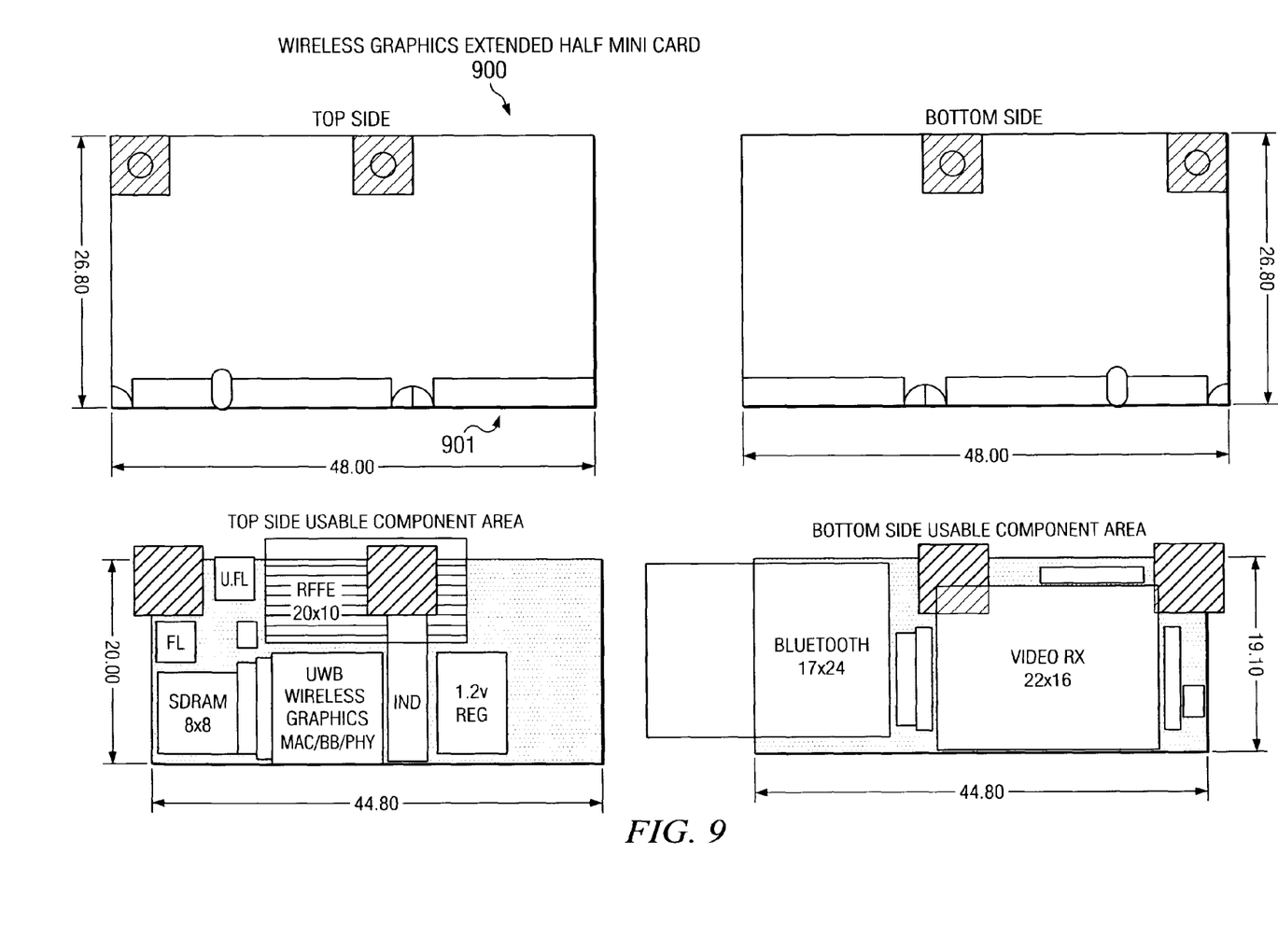
FIG. 9 are top and bottom views of the wireless graphics cards of FIG. 5 implemented on a half mini-card form factor.

Referring to FIG. 9, illustrated are top and bottom views of the wireless graphics cards of FIG. 5 implemented on an extended half mini card 900. The extended half mini card 900 may be implemented by a printed circuit board (PCB). In this embodiment, the video and audio signals are added to an additional PCB edge connector 901 on the extended half mini card 900. The wireless graphics card 402 may be configured as was described in FIG. 5, to support Bluetooth® only 500, WUSB and Bluetooth® 502, and Wireless Video, WUSB, and Bluetooth® 504. For Bluetooth® only 500, all components may be located on a single side (top or bottom) of the half mini card 900 (not shown). For WUSB and Bluetooth® 502 configurations, all components may be located on two sides (top and bottom) of the half mini card 900 (not shown). In the illustrative example, for Wireless Video and WUSB and Bluetooth® 504 configuration, all components may be located on two sides (top and bottom) of the half mini card 900. The extended half mini card 900 supports all these various WPAN cards such that they are able to fit in a single expansion slot of a portable computer. The added advantage of this embodiment is that it maintains standard signal assignments for a standard mini card slot while allowing a wireless graphics card to also utilize the slot.

Thus, provided is a device for use with a portable computer that includes a wireless graphics card. The wireless graphics card includes a connector for coupling to an expansion slot of the portable computer and for receiving a plurality of signals from the portable computer, the plurality of signals including video, audio, and data signals, and an ultra wideband (UWB) chipset coupled to the connector for processing the plurality of signals and for generating an OFDM modulated signal that includes at least the video signal, where the OFDM modulated signal including the video signal is wirelessly transmitted over an UWB link to a monitor for display.

Also provided is a method for use with a portable computer that includes providing a wireless graphics card into an expansion slot of the portable computer, receiving video, audio, and data signals from the portable computer, processing the received signals to generate a video signal suitable for transmission over an UWB link, and wirelessly transmitting the generated video signal to a monitor for display.

Further, provided is a wireless graphics card that includes a printed circuit board (PCB) having dimensions that comply with a mini card form factor, a connector secured to the PCB that includes a plurality of pins that comply with a PCI Express specification, the connector for connecting to an expansion slot of the laptop computer, and a UWB chipset for receiving video, audio, and data signals from the laptop computer via the connector and for processing the video, audio, and data signals for transmission over a UWB link to a UWB-enabled device. The UWB chipset includes an RF transceiver for transmitting and receiving radio signals over the UWB link, a PHY layer for configuring a plurality of communication channels in an UWB spectrum for the RF transceiver, and a Media Access Control (MAC) layer for providing a mechanism for addressing and channel access for the PHY layer.

Each of the above-mentioned components can be implemented as computer software, electrical logic, or combinations thereof. Also, although components are shown separately in the figures, in some embodiments one or more of the components on either side of the wireless link may be combined into a single integrated circuit device, or a group of devices. The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

Several different advantages exist from these and other embodiments. In addition to providing wireless video Graphics from a portable computer to a display monitor, the methods and apparatus disclosed herein provides high resolution (up to 2560×1600), provides wireless video graphics range equal to WUSB range, supports higher density (any number of cube farms and training rooms), is more robust to interference, improves compression of information, uses low power (interfaces to "natural" or "native" video interface from existing GPU or Integrated Graphics Processor in the north bride chipset), requires low bandwidth (send video at reduced frame rate when PHY rate is low due to wireless errors), and provides variable refresh rate support (high refresh if high PHY rate at close range, and low refresh if low PHY rate at longer range).

What is claimed is:

1. A device suitable for use in a portable computer, comprising a wireless graphics card that includes:

a connector for coupling to a PCI Express (Peripheral Component Interconnect Express) mini card slot of the portable computer and for receiving a plurality of signals from the portable computer, the plurality of signals including video, audio, and data signals, said connector including a first set of pins configured to receive video signals from a graphic processing unit, the first set of pins including a pin for a video signal not compliant with the PCI Express mini card standard, the first set of pins including a first pin and a second pin, the first and second pins reserved in the PCI Express mini card standard, the first and second pins configured to receive a main link differential signal, a second set of pins configured to receive audio signals, and at least one pin configured to receive data signals, pins in said first and second sets of pins being different, said at least one pin configured to receive data not being included in said first and second sets of pins, wherein the at least one pin is for a data signal compliant with the PCI Express mini card standard; and an ultra wideband (UWB) chipset coupled to the connector for processing the plurality of signals and for generating an orthogonal frequency-division multiplexing (OFDM) modulated signal that provides video;
wherein the OFDM modulated signal that provides video is wirelessly transmitted over an UWB link to a monitor for display.

2. The device of claim 1, wherein said UWB chipset includes:
a video interface coupled to said connector, said video interface being configured to receive said video signals and generate RGB video signals.

3. The device of claim 1, wherein said wireless graphics card further includes:
a video interface coupled to said connector for receiving said video signals.

4. The device of claim 3, wherein said video interface is coupled to said UWB chipset and is configured to supply RGB video signals to said UWB chipset.

5. The device of claim 4, wherein said video interface is a DisplayPort interface.

6. The device of claim 4, wherein said wireless graphics card further includes:
a High-Bandwidth Digital Content Protection module configured to support content protection.

7. The device of claim 3, wherein said device is a portable computer, the device further comprising:
a memory controller hub, said graphics processing unit coupled to said memory controller hub and being configured to output said video signals to said connector; and
an input/output (I/O) controller hub, coupled to said memory controller hub, said I/O controller hub being configured to output said audio data signals to said connector.

8. A method, comprising:
providing a wireless graphics card including a connector into an expansion slot of a portable computer, the expansion slot compliant with the PCI Express (Peripheral Component Interconnect Express) mini card standard;
receiving video, audio, and data signals from the portable computer via the connector, said connector including
a first set of pins configured to receive video signals from a graphic processing unit, the first set of pins including a pin for a video signal not compliant with the PCI Express mini card standard, the first set of pins including a first pin and a second pin, the first and second ins reserved in the PCI Express mini card standard the first and second sins configured to receive a main link differential signal,
a second set of pins configured to receive audio signals, and
at least one pin configured to receive data signals, pins in said first and second sets of pins being different, said at least one pin configured to receive data not being included in said first and second sets of pins, wherein the at least one pin is for a data signal compliant with the PCI Express mini card standard;
processing the received signals to generate a video signal suitable for transmission over an ultra wideband (UWB) link; and
wirelessly transmitting the generated video signal to a monitor for display.

9. The method of claim 8, wherein the processing step further includes generating
an audio and data signal for wireless transmission.

10. The method of claim 8, wherein the receiving step includes receiving a video signal via a DisplayPort standard, receiving an audio signal via an HD Audio standard, and receiving a data signal via a PCI Express/USB standard.

11. The method of claim 8, wherein receiving video, audio, and data signals include:
receiving said video signals at a video interface coupled to said connector.

12. The method of claim 11, wherein said video interface is coupled to said UWB chipset and is configured to supply RGB video signals to said UWB chipset.

13. The method of claim 12, wherein said video interface is a DisplayPort interface.

14. A wireless graphics card, comprising:
a printed circuit board (PCB) having dimensions that comply with a mini card form factor;
a connector secured to the PCB that includes a plurality of pins that comply with the PCI Express (Peripheral Component Interconnect Express) mini card specification, the connector being used for coupling to an expansion slot of a laptop computer and for receiving a plurality of signals from the laptop computer, said connector including
a first set of pins configured to receive video signals from a graphic processing unit, the first set of pins including a pin for a video signal not compliant with the PCI Express mini card standard, the first set of pins including a first pin and a second pin, the first and second pins reserved in the PCI Express mini card standard, the first and second pins configured to receive a main link differential signal,
a second set of pins configured to receive audio signals, and
at least one pin configured to receive data signals, pins in said first and second sets of pins being different, said at least one pin configured to receive data not being included in said first and second sets of pins, wherein the at least one pin is for a data signal compliant with the PCI Express mini card standard; and
an ultra wideband (UWB) chipset for processing the video, audio, and data signals, received from the laptop computer via the connector, to generate a signal that provides video for transmission over a UWB link to a UWB-enabled device, the UWB chipset including:
a radio frequency (RF) transceiver for transmitting and receiving radio signals over the UWB link;
a physical (PHY) layer for configuring a plurality of communication channels in an UWB spectrum for the RF transceiver; and
a Media Access Control (MAC) layer for providing a mechanism for addressing and channel access for the PHY layer.

15. The wireless graphics card of claim 14, wherein the connector includes input/output pin connections that are defined to be compatible with USB, HD Audio, and DisplayPort interface standards.

16. The wireless graphics card of claim 14, wherein the connector includes input/output pin connections that are defined to support one of a Bluetooth specification only configuration, WUSB and Bluetooth specifications configuration, and Wireless Video, WUSB, and Bluetooth specifications configuration.

17. The wireless graphics card of claim 14, further comprising:
a video interface coupled to said connector for receiving said video signals.

18. The wireless graphics card of claim 17, wherein said video interface is coupled to said UWB chipset and is configured to supply RGB video signals to said UWB chipset.

19. The wireless graphics card of claim 18, wherein said video interface is a DisplayPort interface.

20. A device, comprising a wireless graphics card that includes:
   means for coupling to an expansion slot of a portable computer and for receiving a plurality of signals from the portable computer, the expansion slot compliant with the PCI Express (Peripheral Component Interconnect Express) mini card standard, the plurality of signals including video, audio, and data signals, said means for coupling including
      a first set of pins configured to receive video signals from a graphic processing unit, the first set of pins including a pin for a video signal not compliant with the PCI Express mini card standard, the first set of pins including a first pin and a second pin, the first and second ins reserved in the PCI Express mini card standard the first and second sins configured to receive a main link differential signal,
      a second set of pins configured to receive audio signals, and
      at least one pin configured to receive data signals, pins in said first and second sets of pins being different, said at least one pin configured to receive data not being included in said first and second sets of pins, wherein the at least one pin is for a data signal compliant with the PCI Express mini card standard; and
   means for generating an orthogonal frequency-division multiplexing (OFDM) modulated signal that communicates video; and
   means for wirelessly transmitting the OFDM modulated signal over an ultra wideband (UWB) link to a monitor for display.

21. The device of claim 20, further comprising:
   means for generating RGB signals and supplying said RGB video signals to said means for generating.

22. The device of claim 21, wherein said means for generating RGB signals is a DisplayPort interface.

* * * * *